(12) United States Patent
Wang et al.

(10) Patent No.: US 9,661,132 B2
(45) Date of Patent: May 23, 2017

(54) METHOD, APPARATUS, AND STORAGE MEDIUM FOR DISPLAYING A CONVERSATION INTERFACE

(71) Applicant: Xiaomi Inc., Beijing (CN)

(72) Inventors: Qian Wang, Beijing (CN); Yin Zhu, Beijing (CN); Wenlin Wang, Beijing (CN)

(73) Assignee: XIAOMI INC., Beijing (CN)

( * ) Notice: Subject to any disclaimer, the term of this patent is extended or adjusted under 35 U.S.C. 154(b) by 0 days.

(21) Appl. No.: 15/057,911

(22) Filed: Mar. 1, 2016

(65) Prior Publication Data

US 2016/0366275 A1    Dec. 15, 2016

(30) Foreign Application Priority Data

Jun. 10, 2015   (CN) .......................... 2015 1 0315693

(51) Int. Cl.
  *H04M 3/42*       (2006.01)
  *H04M 1/2745*     (2006.01)

(52) U.S. Cl.
  CPC ... *H04M 3/42042* (2013.01); *H04M 1/27455* (2013.01); *H04M 1/274533* (2013.01); *H04M 3/42102* (2013.01)

(58) Field of Classification Search
  CPC ......... H04M 3/42042; H04M 3/42102; H04M 1/274533; H04M 1/27455
  USPC ................................. 455/415, 416, 417, 418
  See application file for complete search history.

(56) References Cited

U.S. PATENT DOCUMENTS

| | | | |
|---|---|---|---|
| 2002/0021790 A1 | 2/2002 | Corbett et al. | |
| 2003/0086547 A1 | 5/2003 | Chuang | |
| 2005/0031106 A1* | 2/2005 | Henderson | H04M 1/576 379/142.17 |
| 2005/0105705 A1 | 5/2005 | Elcock et al. | |
| 2008/0082421 A1* | 4/2008 | Onyon | G06Q 30/02 705/14.19 |
| 2008/0242282 A1* | 10/2008 | Kuhl | H04M 1/2745 455/415 |
| 2009/0143052 A1* | 6/2009 | Bates | G06F 17/30575 455/414.2 |

(Continued)

FOREIGN PATENT DOCUMENTS

| | | |
|---|---|---|
| CN | 1581900 A | 2/2005 |
| CN | 201528365 U | 7/2010 |

(Continued)

OTHER PUBLICATIONS

International Search Report for Application No. PCT/CN2015/095008 dated Feb. 25, 2016.

(Continued)

*Primary Examiner* — Khai M Nguyen
(74) *Attorney, Agent, or Firm* — Quarles & Brady LLP

(57) ABSTRACT

A method, an apparatus, and storage medium for displaying a conversation interface. In the method: the terminal displays a caller identification display interface when a call request is received from a calling party. The terminal obtains a dynamic image associated with the calling party while displaying the caller identification display interface. The terminal displays the dynamic image in the caller identification display interface. The calling party in the conversation is indicated by using one or more dynamic images so that the display effect is diversified and visualized.

20 Claims, 15 Drawing Sheets

(56) References Cited

U.S. PATENT DOCUMENTS

| 2011/0211678 | A1 | 9/2011 | Woodworth et al. |
| 2011/0249073 | A1* | 10/2011 | Cranfill ................. H04N 7/147 348/14.02 |
| 2013/0083150 | A1 | 4/2013 | Howarter et al. |
| 2014/0111596 | A1* | 4/2014 | Grevers, Jr. ...... H04M 3/42042 348/14.01 |
| 2015/0215450 | A1* | 7/2015 | Seo ........................ H04L 67/22 455/566 |
| 2016/0100050 | A1* | 4/2016 | VanBlon ................ H04W 4/16 455/415 |

FOREIGN PATENT DOCUMENTS

| KR | 100782507 B1 | 12/2007 |
| KR | 20090029541 A | 3/2009 |

OTHER PUBLICATIONS

Extended European Search Report for Application No. 16157929.7 dated Sep. 21, 2016.
Office Action for Korean Application No. 10-2016-7001555 dated Nov. 21, 2016.

\* cited by examiner

METHOD, APPARATUS, AND STORAGE MEDIUM FOR DISPLAYING A CONVERSATION INTERFACE

CROSS-REFERENCE TO RELATED APPLICATION

The present disclosure claims the priority of Chinese Patent Application No. 201510315693.8 filed on Jun. 10, 2015, the entire contents of which are incorporated herein by reference.

TECHNICAL FIELD

The disclosure relates to a mobile communication terminal field, and particularly relates to a method, an apparatus and storage medium for displaying a conversation interface.

BACKGROUND

Mobile phones, which act as commonly used communication tools, provide great convenience for long distance communication for people. Currently, a static image related to calling party may be displayed in the conversation interface to visualize the calling party in calling when both parties are in a conversation.

SUMMARY

In view of the problem in related arts, a method, an apparatus and storage medium for displaying a conversation interface.

According to a first aspect of the disclosure, a method, used in terminals, for displaying a conversation interface is provided, and the method comprises: displaying a caller identification display interface when a call request is received from a calling party; obtaining a dynamic image associated with the calling party while displaying the caller identification display interface; and displaying the dynamic image in the caller identification display interface.

According to a second aspect of the disclosure, an apparatus, used in terminals, for displaying a conversation interface is provided, and the apparatus comprises: a first display module configured to display a caller identification display interface when a call request is received from a calling party; an image obtaining module configured to obtain a dynamic image associated with the calling party while the first display module displays the caller identification display interface and display the dynamic image in the caller identification display interface displayed by the first display module.

According to a third aspect of the disclosure, a terminal device is provided, and the terminal device comprises: a processor; a memory for storing instructions executable by the processor; wherein the processor is configured to: display a caller identification display interface when a call request is received from a calling party; obtain a dynamic image associated with the calling party while displaying the caller identification display interface; and display the dynamic image in the caller identification display interface.

According to a fourth aspect of embodiments of the present disclosure, a non-transitory computer-readable storage medium is provided, the non-transitory computer-readable storage medium configured to store instructions causing a terminal to performing acts comprising: displaying a caller identification display interface when a call request is received from a calling party; obtaining a dynamic image associated with the calling party while displaying the caller identification display interface; and displaying the dynamic image in the caller identification display interface.

It should be understood that both the forgoing general description and the following detailed description are exemplary only, and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Figure 1A:
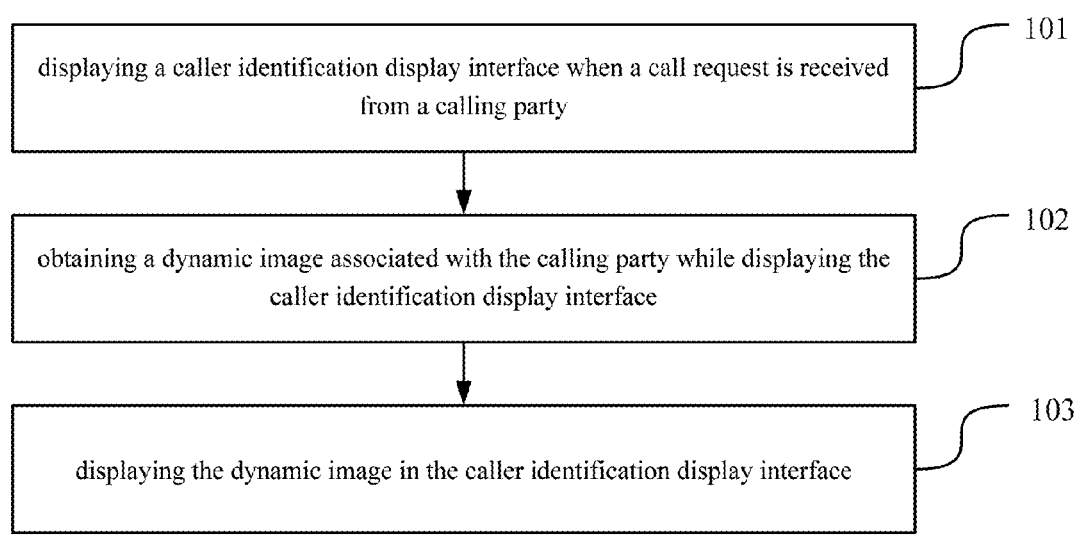
FIG. 1A is a flow diagram of a method for displaying a conversation interface according to an exemplary embodiment.
Figure 1B:
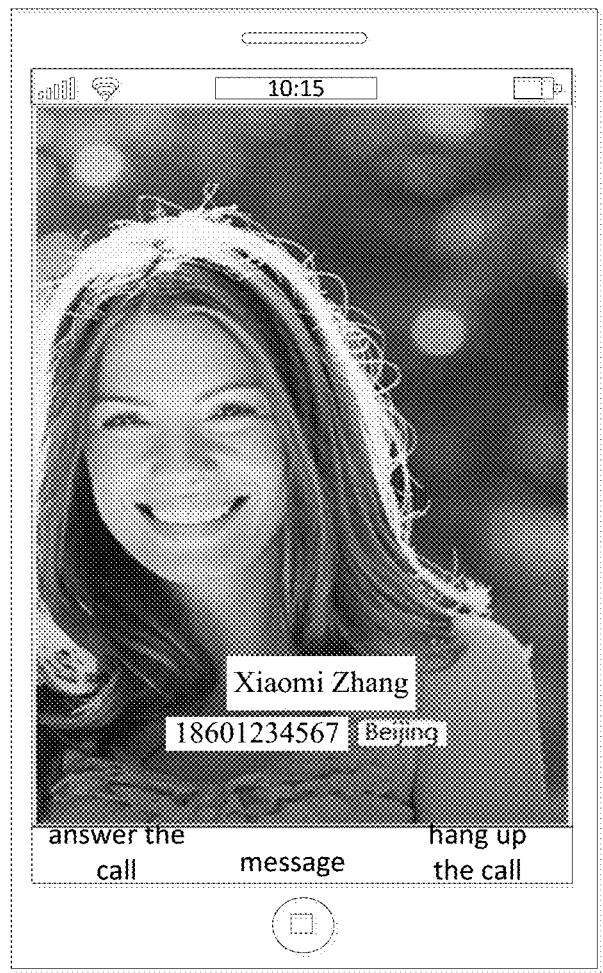
FIG. 1B-1E show a caller identification display interface according to an exemplary embodiment.
Figure 1C:
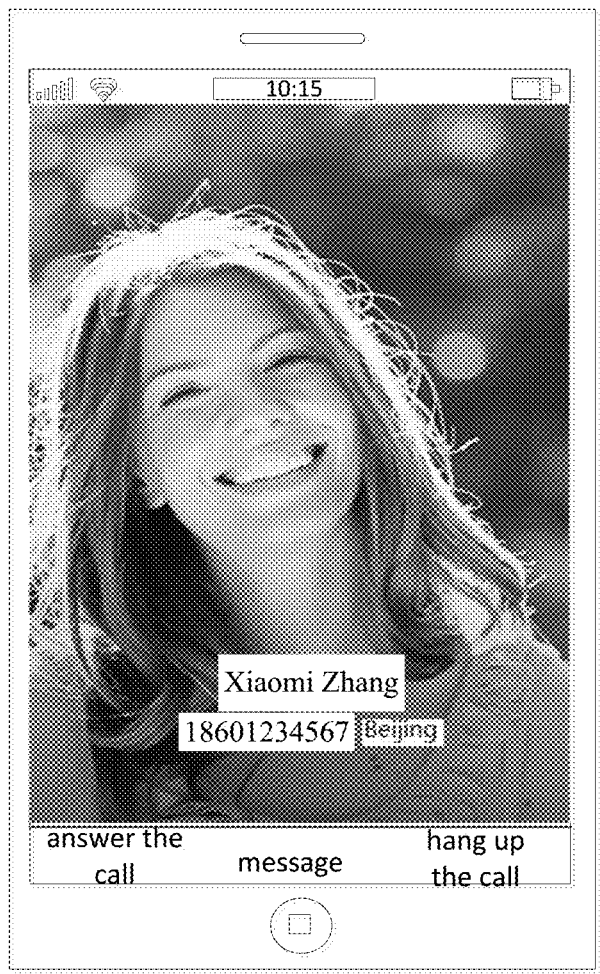
Figure 1D:
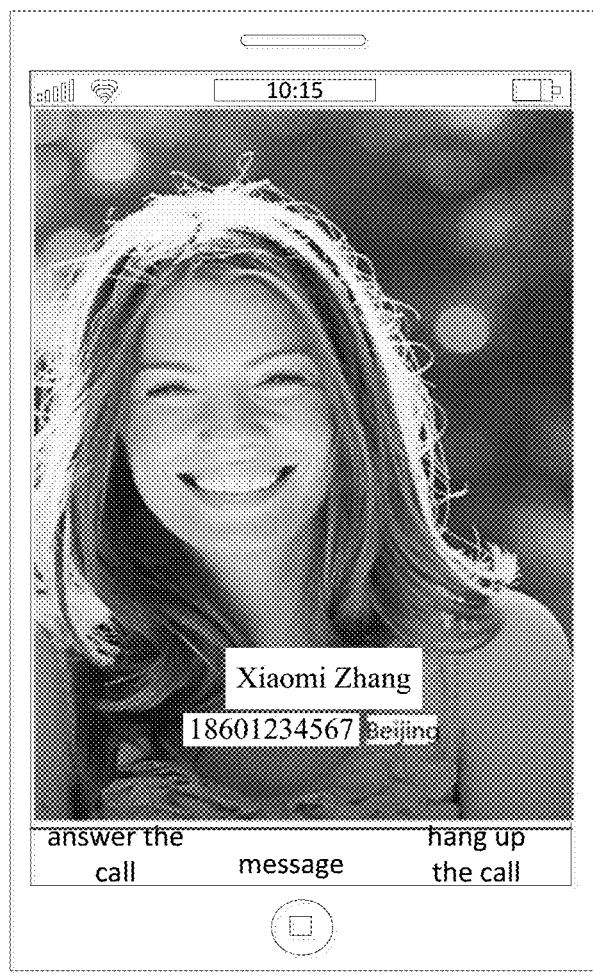
Figure 1E:
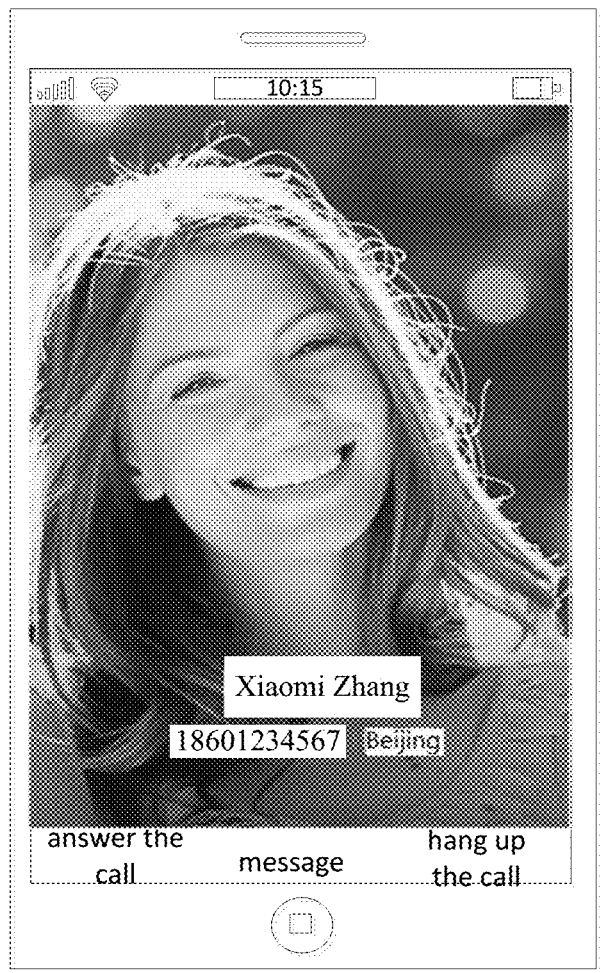

The above figures have illustrated specific embodiments of the disclosure, the more detailed description will be provided hereinafter. These figures and word description are not intended to limit the scope of the disclosure in any manner, but just describe the concept of the disclosure to those skilled in the art by referring to the specific embodiments.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the disclosure. Instead, they are merely examples of devices and methods consistent with aspects related to the disclosure as recited in the appended claims.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

It should be understood, although elements may be described as terms first, second, third or the like in the present disclosure, the elements are not limited by these terms. Rather, these terms are merely used for distinguishing elements of the same type. For example, a first element can also be referred to as a second element, and similarly, a second element can also be referred to as a first element, without departing from the scope of the present disclosure. Depending on the context, as used herein, the word "if" can be interpreted as "at the time when", "when" or "in response to."

Embodiments of the disclosure provide a method for displaying a conversation interface, and the method for displaying the conversation interface may be used in a mobile terminal such as a mobile phone. The mobile terminal may display a caller identification display interface when it received a call request from a calling party, obtain a dynamic image associated with the calling party while displaying the caller identification display interface, and display the dynamic image in the caller identification display interface. The calling party in the conversation is indicated by using one or more dynamic images so that the display effect is diversified and visualized, which improves usage experience and visual experience of users.

FIG. 1A is a flow diagram of a method for displaying a conversation interface according to an exemplary embodiment. The method for displaying the conversation interface may be implemented in a mobile terminal such as a mobile phone, and can comprise the following steps.

Step 101, a caller identification display interface is displayed when a call request is received from a calling party.

Step 102, a dynamic image associated with the calling party is obtained while the caller identification display interface is displayed. The dynamic image may include a plurality of static images which are displayed in a preset frame speed repeatedly. The dynamic image may have an animation effect. The dynamic image may have a file format including one of the following: Graphics Interchange Format (GIF), MP4, WebM, or other video file format.

In the disclosed embodiment, the dynamic image associated with the calling party is pre-edited and stored locally, so the dynamic image associated with the calling party may be obtained from a conversation memory module.

Step 103, the dynamic image is displayed in the caller identification display interface.

As shown in FIG. 1B-1E, a caller identification display interface is provided. The terminal may display several frame images associated with the calling party dynamically in the caller identification display interface by way of example. The dynamic image, associated with the calling party, is displayed in the caller identification display interface while the calling party is in the process of making a call to the terminal so as to differentially display states of the calling party and improve a visual experience of the called party.

In one embodiment, the method for displaying the conversation interface further comprises: processing a static image associated with the calling party based on a predetermined image generation template so as to obtain and store a dynamic image associated with the calling party; or recording and storing a predetermined time of video as the dynamic image associated with the calling party by opening a video recorder.

Figure 1F:
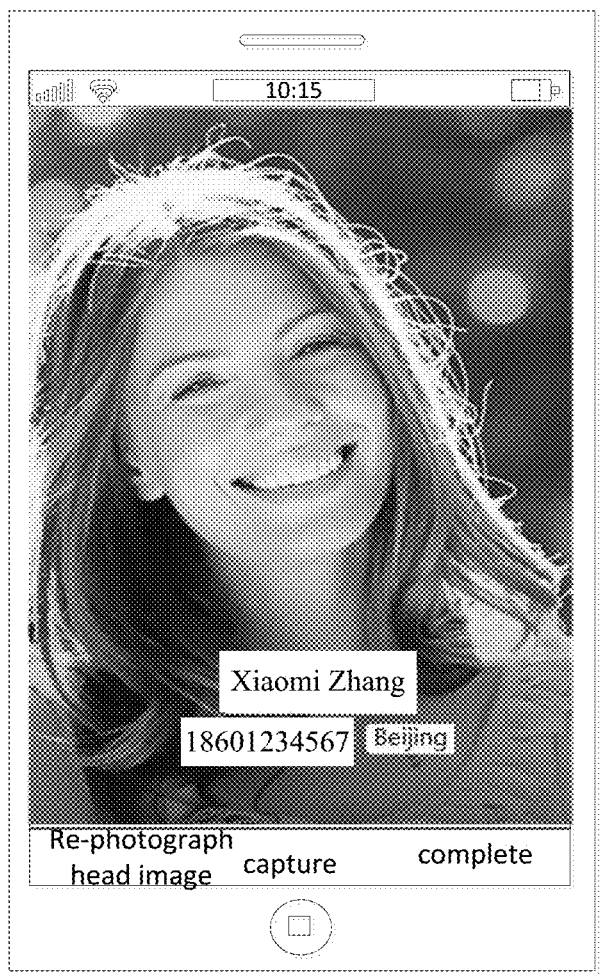
FIG. 1F shows a user interface for editing a dynamic image according to an exemplary embodiment.

For example, a terminal provides an entry for editing dynamic images to a user, as shown in FIG. 1F. The disclosure gives a user interface for editing the dynamic images, and the entry for editing dynamic images is displayed in the display interface of the terminal, for example, the user can open a video recorder to record video as the dynamic image associated with the calling party.

In one embodiment, processing the stored static image associated with the calling party based on the predetermined image generation template so as to obtain and store the dynamic image associated with the calling party comprises: determining whether a current system time is a special date. When the current system time is the special date, the terminal obtains an image generation template corresponding to the special date. The terminal may then fill the static image associated with the calling party into the obtained image generation template to generate the dynamic image associated with the calling party.

For example, the terminal may pre-store corresponding relationships between special dates (for example, Christmas Day, birthday, Spring Festival, Hallowmas) and the image generation templates. As such, when the current system time is the special date, the terminal may obtain an image generation template corresponding to the special date from the above corresponding relationships. The image generation template is a dynamic image and has an image element which indicates the special date. Further, the image generation template can contain an editable region so that the static image associated with the calling party is edited into the editable region, thereby a dynamic image is generated based on the image generation template.

In one or more embodiments, the method for displaying the conversation interface further comprises: displaying a call request interface when calling a called party; obtaining a dynamic image associated with the called party while displaying the call request interface; and displaying the dynamic image associated with the called party in the call request interface.

In one or more embodiments, the way of displaying the conversation interface during calling the called party is similar to the way of displaying the conversation interface during receiving the call from the calling party, which is not repeated herein.

In one or more embodiments, the method for displaying conversation interface further comprises: when receiving a request for viewing detailed information of a contact in an address book, displaying an information display interface of the contact and displaying a dynamic image associated with the contact in the information display interface.

As shown in FIG. 2A-2D, an information display interface of contacts in an address book is provided. The terminal may display several frame images of the dynamic images associated with the calling party dynamically in the contact information display interface by way of example.

In one or more embodiments, the method for displaying the conversation interface further comprises: providing an information editing entry for a user to edit the dynamic image associated with the contact.

Figure 2A:
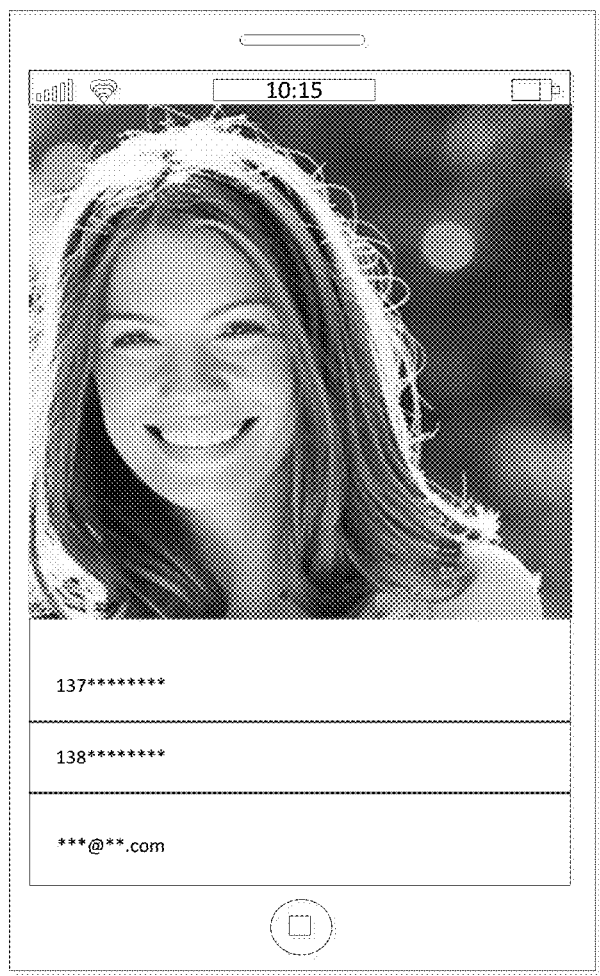
FIG. 2A-2D show an information display interface of a contact in an address book according to an exemplary embodiment.
Figure 2B:
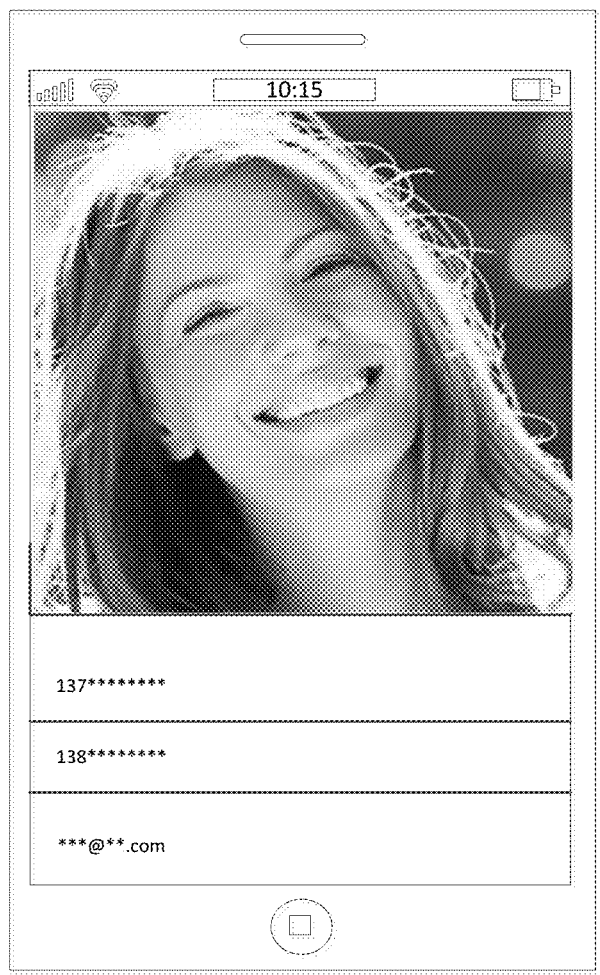
Figure 2C:
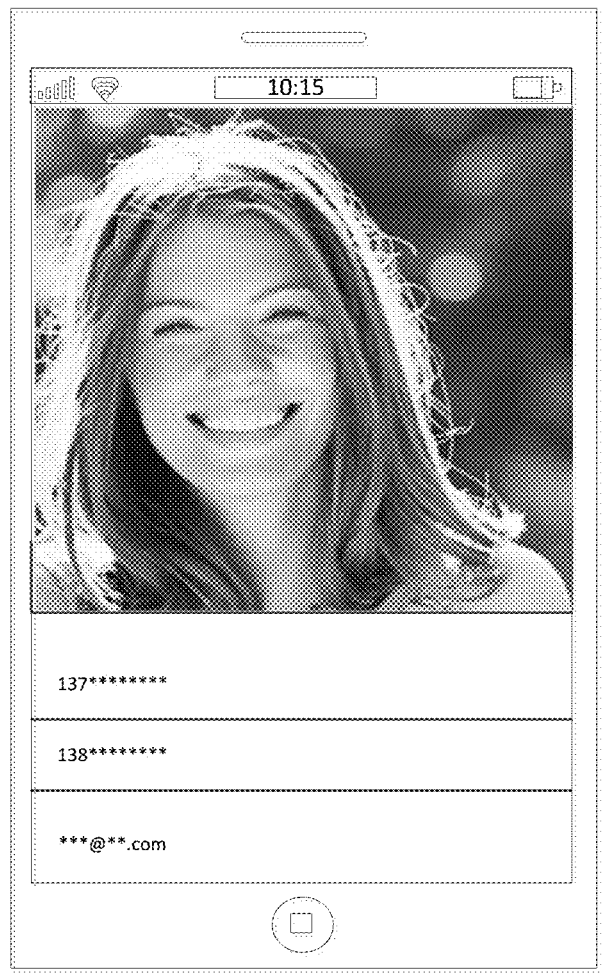
Figure 2D:
Figure 2E:
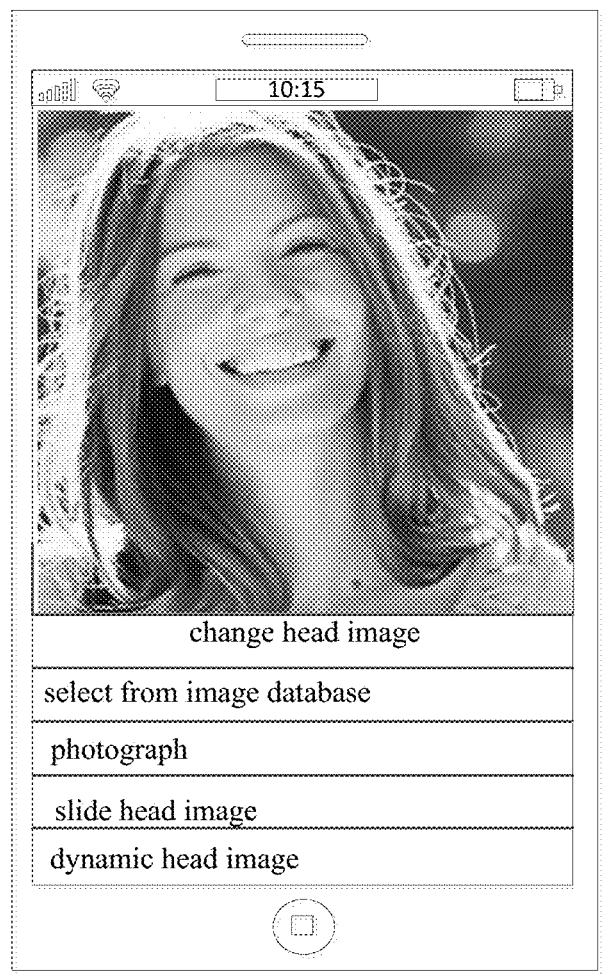
FIG. 2E shows a user interface for editing a dynamic image associated with the contact in the address book according to an exemplary embodiment.

As shown in FIG. 2E, a user interface for editing the dynamic images associated with the contacts in the address book is provided. The user can access to the editing interface through an editing entry displayed in the display interface to edit the dynamic images of the contact, for example, to record video as the dynamic image of the contact, or to select corresponding dynamic images from a dynamic image database. After the user edited the dynamic images of the contact, the dynamic images may be displayed in a contact information display interface when the user opened the contact information display interface.

It should be noted that an order of the disclosure sharing steps provided by embodiments of the disclosure may be adjusted, and the steps can also be added or deleted according to requirements. For those skilled in the art, various modifications and improvements may be made without departing from the spirit and scope of embodiments of the disclosure, and all of which should fall within the protection scope of the disclosure, which is not repeated herein.

In summary, the embodiments of the disclosure provide a method for displaying the conversation interface. The method for displaying the conversation interface comprises: displaying a caller identification display interface when a call request is received from a calling party; obtaining a dynamic image associated with the calling party while displaying the caller identification display interface, and displaying the dynamic image in the caller identification display interface. The calling party in the conversation is indicated by using dynamic images so that the display effect is diversified and visualized, which improves usage experience and visual experience of users.

The apparatus are provided in the following embodiments of the disclosure, which may be used to perform the method of the disclosure. For the details that are not described in apparatus embodiments of the disclosure, please refer to the method embodiments of the disclosure.

Figure 3:
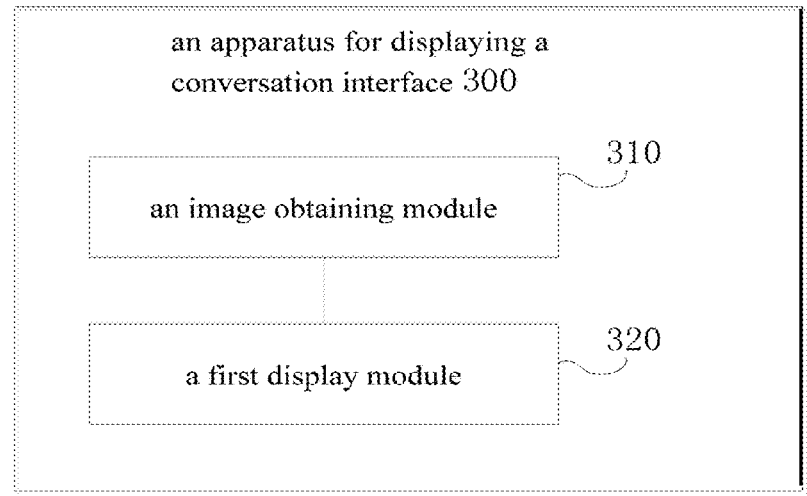
FIG. 3 is a block diagram of an apparatus for displaying a conversation interface according to an exemplary embodiment.

FIG. 3 is a block diagram of an apparatus 300 for displaying a conversation interface according to an exemplary embodiment. The apparatus 300 for displaying the conversation interface may be achieved by software, hardware or a combination of both so as to act as all of or a part of a mobile terminal. The mobile terminal may be a mobile phone. The apparatus 300 for displaying the conversation interface can comprise: a first display module 310 configured to display a caller identification display interface when a call request is received from a calling party; an image obtaining module 320 configured to obtain a dynamic image associated with the calling party while the first display module 310 displays the caller identification display interface and to display the dynamic image in the caller identification display interface displayed by the first display module 310.

In summary, the embodiments of the disclosure provide the apparatus for displaying the conversation interface. The apparatus may include a mobile phone or other electronic device. The apparatus displays a caller identification display interface when a call request is received from a calling party; obtains a dynamic image associated with the calling party while displaying the caller identification display interface, and displays the dynamic image in the caller identification display interface. The calling party in the conversation is indicated by using dynamic images so that the display effect is diversified and visualized, which improves usage experience and visual experience of users.

Figure 4:
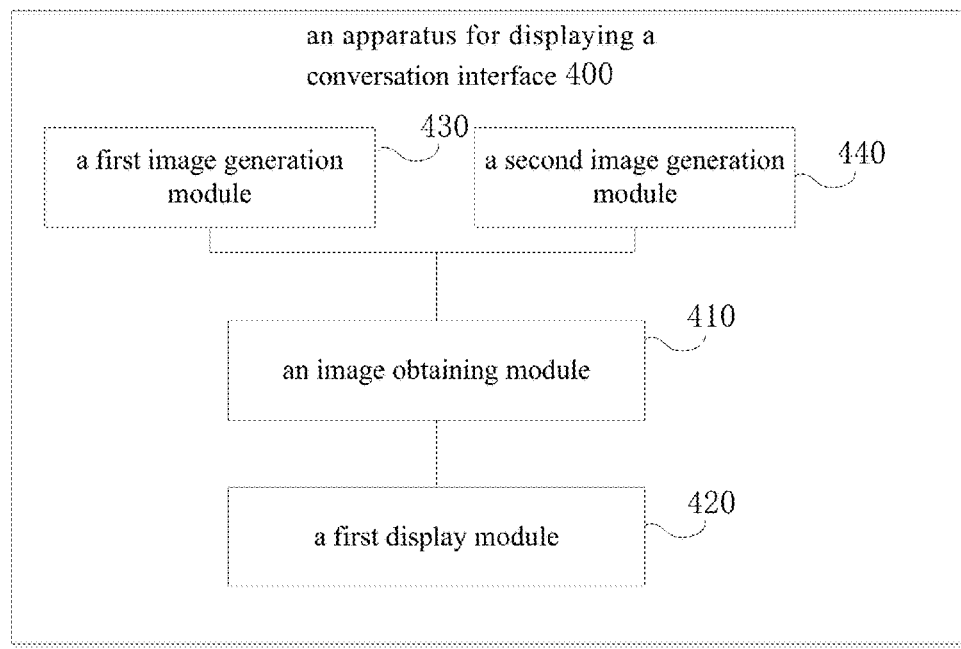
FIG. 4 is a block diagram of an apparatus for displaying a conversation interface according to another exemplary embodiment.

FIG. 4 is a block diagram of an apparatus 400 for displaying a conversation interface according to another exemplary embodiment. The apparatus 400 for displaying the conversation interface may be achieved by software, hardware or a combination of both so as to act as all of or a part of a terminal. The terminal may be a mobile phone. The apparatus 400 can include but are not limited to: a first display module 410 configured to display a caller identification display interface when a call request is received from a calling party; an image obtaining module 420 configured to obtain a dynamic image associated with the calling party while the first display module 410 displays the caller identification display interface and to display the dynamic image in the caller identification display interface displayed by the first display module 410; a first image generation module 430 configured to process a static image associated with the calling party based on a predetermined image generation template so as to obtain and store a dynamic image associated with the calling party; or a second image generation module 440 configured to record and store a predetermined time of video as the dynamic image associated with the calling party by opening a video recorder.

Figure 5:
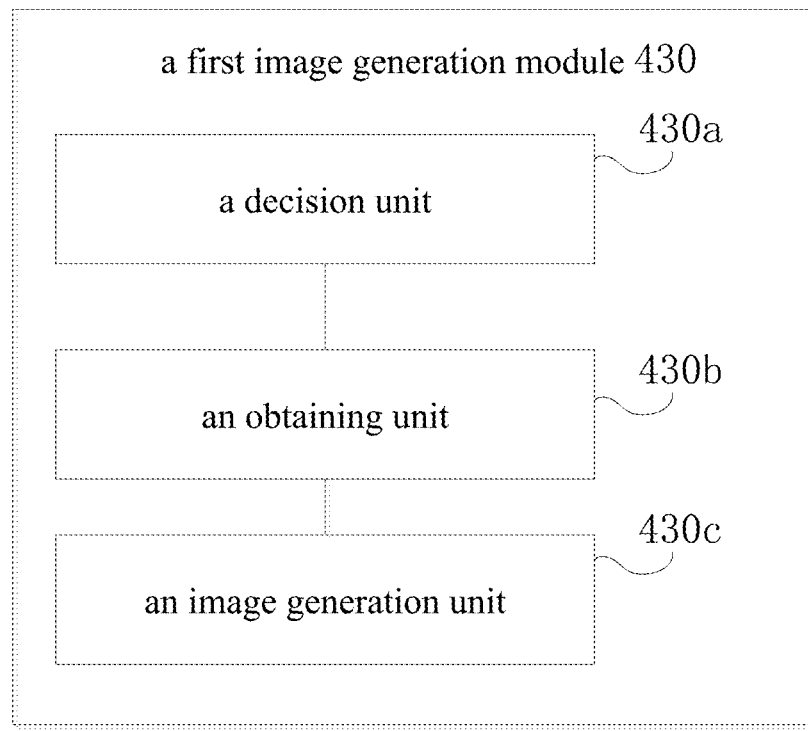
FIG. 5 is a block diagram of a first image generation module according to the embodiment shown by FIG. 4.

Alternatively, FIG. 5 is a block diagram of the first image generation module 430 according to the embodiment shown by FIG. 4, which comprises: a decision unit 430a configured to determine if a current system time is a special date; an obtaining unit 430b configured to obtain an image generation template corresponding to the special date if the current system time is the special date; an image generation unit 430c configured to fill the static image associated with the calling party into the obtained image generation template to generate the dynamic image associated with the calling party.

In one embodiment, the first display module 410 is further configured to display a call request interface when the terminal calls a called party; the image obtaining module 420 is further configured to obtain a dynamic image associated with the called party while the first display module 410 displays the call request interface, and to display the dynamic image associated with the called party in the call request interface displayed by the first display module 410.

Figure 6:
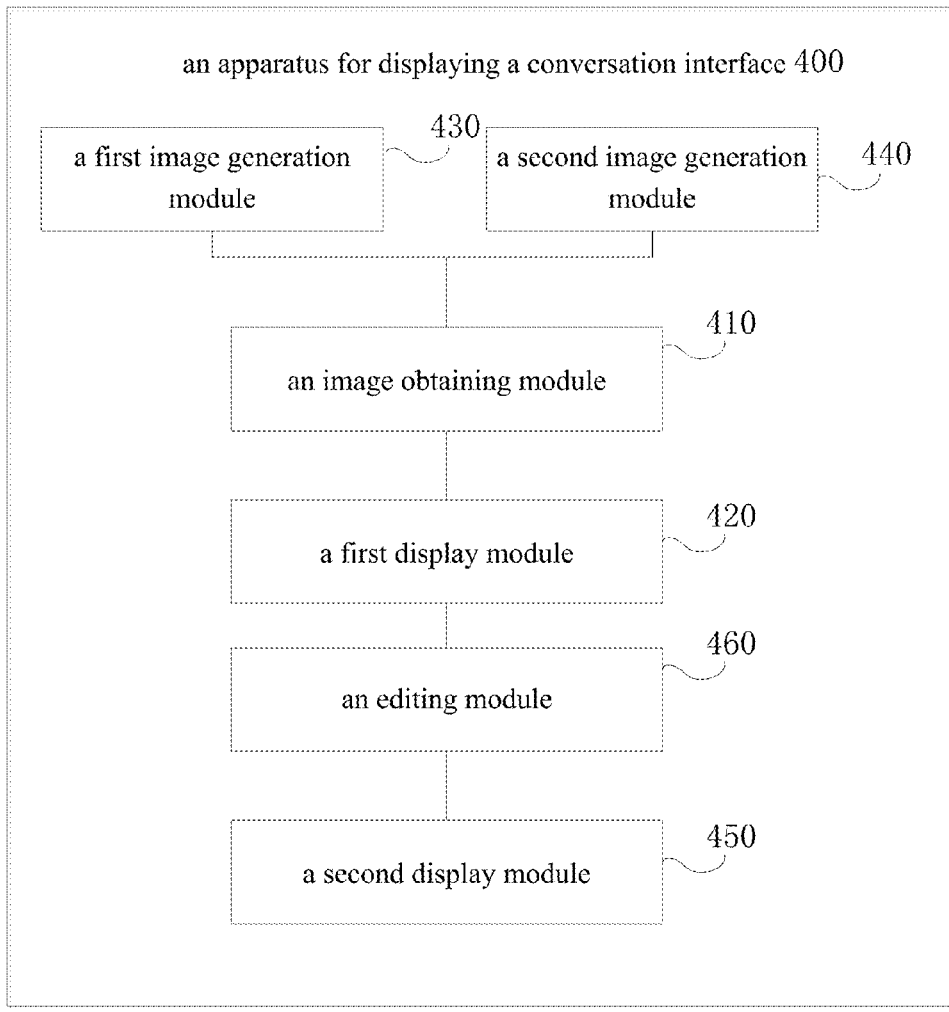
FIG. 6 is a block diagram of an apparatus for displaying a conversation interface according to an exemplary embodiment.

As shown in FIG. 6, the apparatus for displaying the conversation display interface shown in FIG. 4 further comprises: a second display module 450 configured to display an information display interface of the contact and display a dynamic image associated with the contact in the information display interface when receiving a request for viewing detailed information of a contact in an address book; an editing module 460 configured to provide an information editing entry for a user to edit the dynamic image associated with the contact.

In summary, the embodiments of the disclosure provide the apparatus for displaying the conversation interface, the apparatus displays a caller identification display interface when a call request is received from a calling party; obtains a dynamic image associated with the calling party while displaying the caller identification display interface, and displays the dynamic image in the caller identification display interface. The calling party in the conversation is indicated by using one or more dynamic images so that the display effect is diversified and visualized, which improves usage experience and visual experience of users.

For the apparatus of the above embodiments, the operation manner of each module is described in detail in the above method embodiments, which is repeated herein.

The disclosure provides a terminal device, wherein the terminal device may be a mobile phone, and the terminal device comprises: a processor; a memory for storing instructions executable by the processor; wherein the processor is configured to: display a caller identification display interface when a call request is received from a calling party; obtain a dynamic image associated with the calling party while displaying the caller identification display interface; and display the dynamic image in the caller identification display interface.

Figure 7:
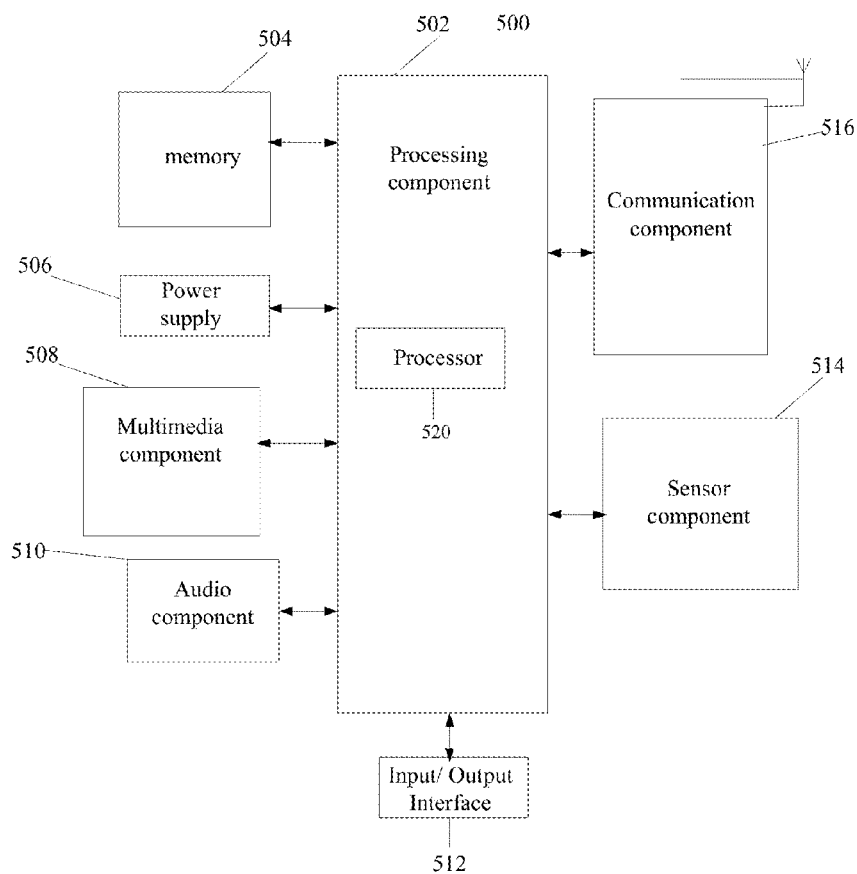
FIG. 7 is a block diagram of an apparatus for displaying a conversation interface according to an exemplary embodiment.

Referring to FIG. 7, it shows a block diagram of an apparatus 500 for displaying a conversation interface according to an exemplary embodiment. For example, the apparatus 500 may be a mobile phone, a computer, a digital broadcasting terminal, a message transceiver, a game console, a tablet device, a medical device, an exercise facility, a personal digital assistant, and the like.

As shown in FIG. 7, the apparatus 500 can comprises one or more components: a processing component 502, a memory 504, a power supply component 506, a multimedia component 508, an audio component 510, an input/output (I/O) interface 512, a sensor component 514 and a communication component 516.

The processing component 502 typically controls entire operations of the apparatus 500, such as operations relevant to displaying, phone calling, data communication, camera operation, and recording operation. The processing component 502 can comprise one or more processors 520 for executing instructions to implement all of or a part of steps of the method as described above. Further, the processing component 502 can comprises one or more modules for assisting interaction between the processing component 502 and other components. For example, the processing component 502 can comprise a multimedia module for interaction between the multimedia component 508 and the processing component 502.

The memory 504 is configured to store any kind of data in order for supporting operations of the apparatus 500. Examples of the data include any application or method instructions for execution on the apparatus 500, contact data, phone book data, messages, pictures, videos and so on. The memory 504 may be implemented as any kind of volatile and non-volatile memory device or any combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic or optical disk.

The power component 506 supplies power to the various components of the apparatus 500. The power supply component 506 can comprise a power management system, one or more power supplies and other components associated with power generation, management and allocation of the apparatus 500.

The multimedia component 508 comprises a screen for providing an output interface between the apparatus 500 and the user. In some embodiments, the screen can comprise Liquid Crystal Display (LCD) and Touch Panel (TP). In the case where the screen comprises a touch panel, the screen may be implemented as a touch screen for receiving input signals from the user. The touch panel comprises one or more touch sensors for sensing touches, sliding, and gestures on the touch panel. The touch sensor not only can sense boundary line of an action of touch or sliding, but also can sense duration period and pressure of the action of touch or sliding. In some embodiments, the multimedia component 508 comprises a frond camera and/or a rear camera. When the apparatus 500 is in an operation mode such as capture mode or video mode, the front camera and/or the rear camera can receive multimedia data from outside. Each of the front camera and the rear camera may be a fixed optical lens system or has capability of focus and optical zoom.

The audio component 510 is configured to input and/or output audio signals. For example, the audio component 510 comprises a microphone (MIC), and when the apparatus 500 is in an operation mode such as calling mode, recording mode or voice recognition mode, the microphone is configured to receive audio signals from outside. The received audio signals may be further stored in the memory 504 or transmitted via the communication component 516.

The I/O interface 512 provides an interface between the processing component 502 and a periphery interface module. The periphery interface module may be a keyboard, a click wheel, and buttons or the like. The buttons comprise but are not limited to a home page button, a volume button, a start button, and a lock button.

The sensor component 514 comprises one or more sensors for providing the apparatus 500 with various aspects of status estimations. For example, the sensor component 514 can sense open/close status of the apparatus 500 and relative position of a component, for example, the component may be the display or the small keyboard of the apparatus 500. The sensor component 514 can also sense change in position of the apparatus 500 or a component thereof, presence of contact by a user with the apparatus 500, direction, acceleration, deceleration of the apparatus 500, and change in temperature of the apparatus 500. The sensor component 514 can also comprise an approaching sensor configured to sense presence of adjacent objects without any physical contact. The sensor component 514 can also comprise an optical sensor such as CMOS or CCD image sensor for use in image capture. In an embodiment, the sensor component 514 can also comprise an acceleration sensor, a gyroscope sensor, a magnetic sensor, a pressure sensor or a temperature sensor.

The communication component 516 is configured to assist wired or wireless communication between the apparatus 500 and other devices. The apparatus 500 can access a wireless network based on a communication standard such as WiFi, 2G or 3G or any combination thereof. In an exemplary embodiment, the communication component 516 receives broadcast signals or broadcast related information from an outside broadcast management system via a broadcast channel. In an exemplary embodiment, the communication component 516 can also comprise a Near Field Communication (NFC) module for assisting short range communication. For example, the NFC module may be implemented based on Radio Frequency Identification (RFID) technology, Infrared Data Association (IrDA) technology, Ultra Wideband (UWB) technology, Blue Tooth (BT) technology and other technologies.

In an exemplary embodiment, the apparatus 500 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, or other electronic elements for performing the method as described above. Each module or unit discussed above, such as the first display module or the image obtaining module, may take the form of a packaged functional hardware unit designed for use with other components, a portion of a program code (e.g., software or firmware) executable by the processor 520 or the processing circuitry that usually performs a particular function of related functions, or a self-contained hardware or software component that interfaces with a larger system, for example.

In an exemplary embodiment, there provides a non-temporary computer readable memory medium containing instructions, such as the memory 504 having instructions that are executable by the processor(s) 520 to perform the method as described above. For example, the non-temporary computer readable memory medium may be a ROM, a RAM, a CD-ROM, a magnetic disk, a floppy disk, an optical data memory device or the like.

A non-temporary computer readable memory medium having instructions, the instructions, when executable by a processor of a terminal, enables the apparatus 500 to perform a method for displaying the conversation interface.

With considering disclosure of the present specification and doing practices accordingly, it is obvious for those skilled in the art to anticipate other embodiments of the disclosure. The application intends to cover all of variations, applications and adaption of the disclosure, which comply with the general concept of the disclosure and comprise those customary technical means or common knowledge in the art that are not disclosed in the disclosure. The specification and embodiments are merely considered to be exemplary and the substantive scope and spirit of the disclosure is limited only by the appended claims.

It should be understood that the disclosure is not limited to the precise structure as described above and shown in the figures, but can have various modification and alternations without departing from the scope of the disclosure. The scope of the disclosure is limited only by the appended claims.

What is claimed is:

1. A method, comprising:
    displaying, by a terminal, a caller identification display interface when a call request is received from a calling party;
    obtaining, by the terminal, a dynamic image associated with the calling party while displaying the caller identification display interface; and
    displaying, by the terminal, the dynamic image in the caller identification display interface, wherein the dynamic image comprises multiple static images that are displayed in a preset frame speed repeatedly.

2. The method of claim 1, further comprising:
    processing, by the terminal, a static image associated with the calling party based on a predetermined image generation template so as to obtain and store a dynamic image associated with the calling party.

3. The method of claim 1, further comprising:
    recording, by a video recorder in the terminal, and storing a predetermined time of video as the dynamic image associated with the calling party.

4. The method of claim 2, wherein processing the static image associated with the calling party based on the predetermined image generation template so as to obtain and store the dynamic image associated with the calling party comprises:
    determining whether a current system time is a special date;
    when the current system time is the special date, obtaining an image generation template corresponding to the special date; and
    filling the static image associated with the calling party into the obtained image generation template to generate the dynamic image associated with the calling party.

5. The method of claim 1, further comprising:
    displaying a call request interface when calling a called party;
    obtaining a second dynamic image associated with the called party while displaying the call request interface; and
    displaying the second dynamic image associated with the called party in the call request interface.

6. The method of claim 1, further comprising:
    when receiving a request for viewing detailed information of a contact in an address book, displaying an information display interface of the contact and displaying a dynamic image associated with the contact in the information display interface.

7. The method of claim 6, further comprising:
    providing an information editing entry for a user to edit the dynamic image associated with the contact.

8. A device, comprising:
    a processor;
    a memory for storing processor-executable instructions;
    wherein the processor is configured to:
        display a caller identification display interface when a call request is received from a calling party;
        obtain a dynamic image associated with the calling party while displaying the caller identification display interface; and
        display the dynamic image in the caller identification display interface, wherein the dynamic image comprises multiple static images that are displayed in a preset frame speed repeatedly.

9. The device of claim 8, wherein the processor is further configured to:
    process a static image associated with the calling party based on a predetermined image generation template so as to obtain and store a dynamic image associated with the calling party.

10. The device of claim 8, wherein the processor is further configured to:
    record and store a predetermined time of video as the dynamic image associated with the calling party by opening a video recorder.

11. The device of claim 9, wherein the processor is further configured to:
    determine whether a current system time is a special date;
    obtain an image generation template corresponding to the special date when the current system time is the special date; and
    fill the static image associated with the calling party into the obtained image generation template to generate the dynamic image associated with the calling party.

12. The device of claim 8, wherein the processor is further configured to:
    display a call request interface when calling a called party;
    obtain a second dynamic image associated with the called party while displaying the call request interface; and
    display the second dynamic image associated with the called party in the call request interface.

13. The device of claim 8, wherein the processor is further configured to:
    display an information display interface of a contact and display a dynamic image associated with the contact in the information display interface when receiving a request for viewing detailed information of a contact in an address book.

14. The device of claim 13, wherein the processor is further configured to provide an information editing entry for a user to edit the dynamic image associated with the contact.

15. A non-transitory computer-readable storage medium configured to store instructions causing a terminal to performing acts comprising:
    displaying a caller identification display interface when a call request is received from a calling party;
    obtaining a dynamic image associated with the calling party while displaying the caller identification display interface; and
    displaying the dynamic image in the caller identification display interface, wherein the dynamic image comprises multiple static images that are displayed in a preset frame speed repeatedly.

16. The non-transitory computer-readable storage medium of claim 15, wherein the acts further comprise:
    processing, by the terminal, a static image associated with the calling party based on a predetermined image generation template so as to obtain and store a dynamic image associated with the calling party.

17. The non-transitory computer-readable storage medium of claim 15, wherein the acts further comprise:
    recording, by a video recorder in the terminal, and storing a predetermined time of video as the dynamic image associated with the calling party.

18. The non-transitory computer-readable storage medium of claim 16, wherein the acts further comprise:
    determining whether a current system time is a special date;
    when the current system time is the special date, obtaining an image generation template corresponding to the special date; and
    filling the static image associated with the calling party into the obtained image generation template to generate the dynamic image associated with the calling party.

19. The non-transitory computer-readable storage medium of claim 15, wherein the acts further comprise:
    displaying a call request interface when calling a called party;
    obtaining a second dynamic image associated with the called party while displaying the call request interface; and
    displaying the second dynamic image associated with the called party in the call request interface.

20. The non-transitory computer-readable storage medium of claim 15, wherein the acts further comprise:
    when receiving a request for viewing detailed information of a contact in an address book, displaying an information display interface of the contact and displaying a dynamic image associated with the contact in the information display interface.

* * * * *